US012812256B2

(12) United States Patent
Kim et al.

(10) Patent No.: US 12,812,256 B2
(45) Date of Patent: Nov. 24, 2026

(54) METHOD OF OPERATING IMAGE SIGNAL PROCESSOR ADJUSTING IMAGE BRIGHTNESS BASED ON ORDINARY DIFFERENTIAL EQUATION, ELECTRONIC DEVICE INCLUDING THE IMAGE SIGNAL PROCESSOR, AND METHOD OF OPERATING THE ELECTRONIC DEVICE

(71) Applicant: Samsung Electronics Co., Ltd., Suwon-si (KR)

(72) Inventors: Taehyun Kim, Seoul (KR); Daehyun Kim, Seoul (KR); Donggoo Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 182 days.

(21) Appl. No.: 19/002,037

(22) Filed: Dec. 26, 2024

(65) Prior Publication Data

US 2025/0274669 A1 Aug. 28, 2025

(30) Foreign Application Priority Data

Feb. 26, 2024 (KR) ........................ 10-2024-0027508

(51) Int. Cl.
*H04N 23/76* (2023.01)
*G06V 10/60* (2022.01)
(Continued)

(52) U.S. Cl.
CPC ............. *H04N 23/76* (2023.01); *G06V 10/60* (2022.01); *G06V 10/751* (2022.01); *G06V 10/82* (2022.01); *H04N 23/71* (2023.01)

(58) Field of Classification Search
CPC ...... H04N 23/76; H04N 23/71; H04N 23/617; H04N 23/70; G06V 10/60; G06V 10/751;
(Continued)

(56) References Cited

U.S. PATENT DOCUMENTS 11,776,092 B2 * 10/2023 Lee ........................... G06T 5/40 382/254
2025/0213863 A1 * 7/2025 Abouelsoud ......... A61N 1/0456
2025/0226690 A1 * 7/2025 Roy Chowdhury ...... H02J 3/18

FOREIGN PATENT DOCUMENTS

CN 114663300 A 6/2022
CN 115511754 A 12/2022
(Continued)

OTHER PUBLICATIONS

C. Guo et al. 'Zero-Reference Deep Curve Estimation for Low-Light Image Enhancement' IEEE, CVPR 2020, pp. 1780-1789.
(Continued)

*Primary Examiner* — Delomia L Gilliard
(74) *Attorney, Agent, or Firm* — FISH & RICHARDSON P.C.

(57) ABSTRACT

Provided is a method of operating an image signal processor, the method including receiving a plurality of first pixel values, calculating a plurality of first adjustment functions corresponding to the plurality of first pixel values, respectively, based on a neural ordinary differential equation (ODE) network model configured to generate, based on a pixel value, an adjustment function which is an optimal trajectory corresponding to the pixel value, generating a plurality of first adjusted pixel values corresponding to the plurality of first pixel values, respectively, based on the plurality of first adjustment functions, and learning the neural ODE network model based on a loss function on the basis of the plurality of first pixel values and the plurality of first adjusted pixel values, the adjustment function being an optimal trajectory in an adjustment section corresponding to a number of adjustment repetitions for adjusting the pixel value.

20 Claims, 12 Drawing Sheets

(51) Int. Cl.

| | |
|---|---|
| ***G06V 10/75*** | (2022.01) |
| ***G06V 10/82*** | (2022.01) |
| ***H04N 23/71*** | (2023.01) |

(58) Field of Classification Search

CPC ........ G06V 10/82; G06V 10/40; G06V 10/75; G06T 2207/20081; G06T 2207/20084; G06T 5/60; G06T 5/77; G06T 5/90; G06F 17/13; G06N 3/088

See application file for complete search history.

(56) References Cited

FOREIGN PATENT DOCUMENTS

| | | | |
|---|---|---|---|
| CN | 115984535 | A | 4/2023 |
| CN | 116703745 | A | 9/2023 |
| CN | 116797488 | A | 9/2023 |
| KR | 10-2021-0053052 | A | 5/2021 |

OTHER PUBLICATIONS

R. T. Q. Chen et al. ‘Neural Ordinary Differential Equations’ 32nd Conference on Neural Information Processing Systems (NeurIPS 2018), pp. 1-13.

G. Kim ‘Deep Dehazing Powered by Image Processing Network’ IEEE/CVF Conference on Computer Vision and Pattern Recognition CVPRW, 2023, pp. 1209-1218.

Z. Fu, ‘Learning a Simple Low-light Image Enhancer from Paired Low-light Instances’ 2023 IEEE/CVF Conference on Computer Vision and Pattern Recognition, CVPR, pp. 22252-22261.

R. Wang, ‘Underexposed Photo Enhancement using Deep Illumination Estimation’ IEEE/CVF Conference on Computer Vision and Pattern Recognition CVPR, 2019, pp. 6849-6857.

J. Li, et al. ‘Multi-scale Residual Network for Image Super-Resolution’ Computer Vision—ECCV 2018: 15th European Conference, 2018, pp. 1-17.

Y. Mansour et al. ‘Zero-Shot Noise2Noise: Efficient Image Denoising without any Data’ 2023, Computer Vision and Pattern Recognition, pp. 14018-14027.

* cited by examiner

METHOD OF OPERATING IMAGE SIGNAL PROCESSOR ADJUSTING IMAGE BRIGHTNESS BASED ON ORDINARY DIFFERENTIAL EQUATION, ELECTRONIC DEVICE INCLUDING THE IMAGE SIGNAL PROCESSOR, AND METHOD OF OPERATING THE ELECTRONIC DEVICE

CROSS-REFERENCE TO RELATED APPLICATION

This application is based on and claims priority under 35 U.S.C. § 119 to Korean Patent Application No. 10-2024-0027508, filed on Feb. 26, 2024, in the Korean Intellectual Property Office, the disclosure of which is incorporated by reference herein in its entirety.

BACKGROUND

The inventive concepts relate to image signal processors, and more particularly, to methods of operating an image signal processor that adjusts the brightness of an input image based on an ordinary differential equation, electronic devices including the image signal processor, and methods of operating the electronic device.

A neural network refers to a computational architecture that models the biological brain. As neural network technology has recently developed, research is being actively conducted to analyze input data and extract valid information using neural network devices which use one or more neural network models in various types of electronic systems.

Machine Learning is a field of artificial intelligence using neural networks and refers to technology that creates new knowledge by inputting data into a computer and learning the same. In particular, significant progress has been made in the field of neural network, one of machine learning technologies, and as a result, deep learning was born.

Deep learning is a type of machine learning technology based on an artificial neural network. Although the artificial neural network is designed with a multi-layer structure and becomes deeper, learning efficiency may be improved by preprocessing the data for learning through unsupervised learning. In particular, deep learning has recently shown rapid development due to the improvement of big data through the Internet and computing capabilities to process big data.

In general, electronic devices may use a network model to adjust the brightness of an image. At this time, the accuracy of brightness adjustment may be improved by learning a private network model based on preset data sets. However, learning is limited due to the limited number of data sets and learning results may be biased depending on the data sets. Therefore, a network model that can adjust the brightness of the image regardless of the preset data sets is required.

SUMMARY

The inventive concepts provide methods of operating an image signal processor for adjusting the brightness of captured images based on a neural ordinary differential equation (ODE) network model that performs unsupervised learning, electronic devices including the image signal processor, and methods of operating the electronic device.

The inventive concepts are not limited to the mentioned above, and other inventive concepts not mentioned may be clearly understood by those skilled in the art from the description below.

According to some aspects of the inventive concepts, there is provided a method of operating an image signal processor, the method including receiving a plurality of first pixel values corresponding to a first image captured through a plurality of pixels, calculating a plurality of first adjustment functions corresponding to the plurality of first pixel values, respectively, based on a neural ODE network model configured to generate, based on a pixel value, an adjustment function which is an optimal trajectory corresponding to the pixel value, generating a plurality of first adjusted pixel values corresponding to the plurality of first pixel values, respectively, based on the plurality of first adjustment functions, and learning the neural ODE network model based on a loss function on the basis of the plurality of first pixel values and the plurality of first adjusted pixel values, the adjustment function generated by the neural ODE network model being an optimal trajectory in an adjustment section corresponding to a number of adjustment repetitions for adjusting the pixel value.

According to some aspects of the inventive concepts, there is provided an electronic device including an image sensor including a plurality of pixels, and an image signal processor configured to generate adjusted pixel values obtained by adjusting pixel values output from the image sensor, wherein the image sensor is configured to generate a plurality of first pixel values corresponding to a first image captured through the plurality of pixels, the image signal processor configured to calculate a plurality of first adjustment functions corresponding to the plurality of first pixel values, respectively, based on a neural ODE network model configured to generate, based on a pixel value, an adjustment function which is an optimal trajectory corresponding to the pixel value and generate a plurality of first adjusted pixel values corresponding to the plurality of first pixel values, respectively, based on the plurality of first adjustment functions.

According to some aspects of the inventive concepts, there is provided a method of operating an electronic device, the method including generating a plurality of first pixel values corresponding to a first image captured through a plurality of pixels, calculating a plurality of first adjustment functions corresponding to the plurality of first pixel values, respectively, based on a neural ODE network model configured to generate, based on a pixel value, an adjustment function which is an optimal trajectory corresponding to the pixel value, generating a plurality of first adjusted pixel values corresponding to the plurality of first pixel values, respectively, based on the plurality of first adjustment functions, generating a first loss value based on a loss function on the basis of the plurality of first pixel values and the plurality of first adjusted pixel values, and learning the neural ODE network model based on the first loss value, the adjustment function generated by the neural ODE network model being an optimal trajectory in an adjustment section corresponding to a number of adjustment repetitions for adjusting the pixel value.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
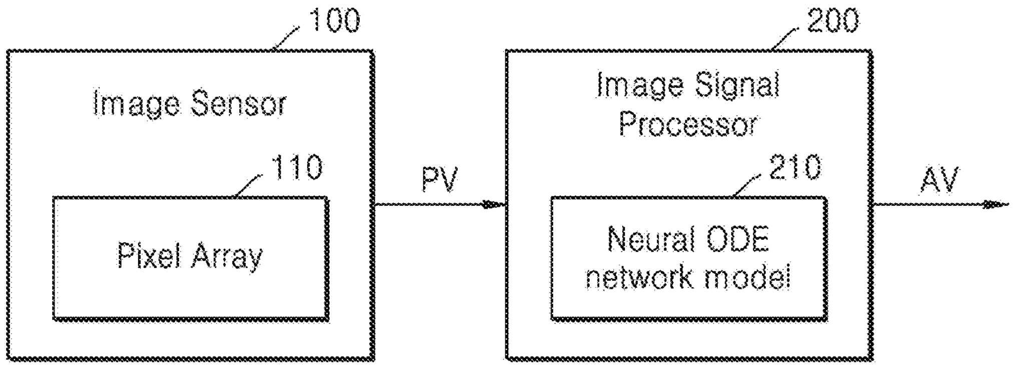
FIG. 1 is a block diagram of an electronic device according to some example embodiments.

FIG. 1 is a block diagram of an electronic device according to some example embodiments.

Referring to FIG. 1, an electronic device 1 according to the inventive concepts may include an image sensor 100 and an image signal processor 200.

The electronic device 1 may be mounted on an electronic device having an image or light sensing function. For example, the electronic device 1 may be mounted on an electronic device, such as a camera, a smartphone, a wearable device, the Internet of Things (IoT), a tablet personal computer (PC), a personal digital assistant (PDA), a portable multimedia player (PMP), a navigation device, and the like. Additionally, the electronic device 1 may be mounted on an electronic device used as a part in vehicles, furniture, manufacturing facilities, doors, various measuring devices, etc.

The image sensor 100 may capture an image by receiving incident light reflected from a subject. The image sensor 100 may generate a plurality of pixel values PV corresponding to the captured image (or referred to as an input image). The image sensor 100 may output the plurality of pixel values PV to the image signal processor 200.

The image sensor 100 may include a pixel array 110 including a plurality of pixels. Although not shown for convenience of explanation, the image sensor 100 may include a row driver, a ramp signal generator, and an analog-to-digital converter to generate the plurality of pixel values PV corresponding to the plurality of pixels, respectively. However, components included in the image sensor 100 according to the inventive concepts are not limited thereto and the image sensor 100 may further include additional components for generating pixel values. For example, the image sensor 100 may further include a counting code generator that generates a counting code corresponding to a pixel signal.

Each of the plurality of pixels may include at least one photoelectric conversion element, wherein the pixel may detect light using the photoelectric conversion element and output the pixel signal, which is an electrical signal according to the detected light. The pixel signal may be converted to a pixel value through the ramp signal generator and the analog-to-digital converter described above. For example, the pixel signal may have a voltage level corresponding to an analog signal and the pixel value PV may have a value corresponding to a digital signal.

More specifically, the image sensor 100 may generate a plurality of pixel signals corresponding to the captured image through the plurality of pixels, the ramp signal generator may generate a ramp signal of which the level rises or falls at a certain slope, and the analog-to-digital converter may convert the pixel signals into pixel values PV, which are digital signals, by comparing the pixel signals with the ramp signal.

The image signal processor 200 may perform noise reduction processing, gain adjustment, waveform normalization processing, interpolation processing, white balance processing, gamma processing, edge emphasis processing, binning, and/or the like on image data (e.g., the plurality of pixel values). The image signal processor 200 according to the inventive concepts may receive the plurality of pixel values PV corresponding to the captured image from the image sensor 100. The image signal processor 200 according to the inventive concepts may adjust the brightness of the captured image based on the plurality of pixel values PV to generate a plurality of adjusted pixel values AV corresponding to an output image (or referred to as an adjusted image).

The image signal processor 200 according to the inventive concepts may generate the plurality of adjusted pixel values AV by adjusting the plurality of pixel values PV based on a neural ordinary differential equation (ODE) network model 210. More specific details regarding the operation of the image signal processor 200 that adjusts the brightness of the image based on the neural ODE network model 210 are described below.

The electronic device 1 according to the inventive concepts may adjust the brightness of the captured image based on the neural ODE network model 210 to generate the output image with the adjusted brightness. For example, the electronic device 1 may generate an output image by adjusting the brightness of a low-light image captured in a low-light environment. The output image may be a brighter image than the captured low-light image. Accordingly, the visibility of dark areas in the output image may be improved, compared to the captured low-light image. In other words, the dynamic range of the output image may be wider than the dynamic range of the captured low-light image.

As another example, the electronic device 1 may generate an output image by adjusting the brightness of a high-light image captured in a high-light environment. The output image may be a darker image than the captured high-light image. Accordingly, the visibility of bright areas of the output image may be improved, compared to the captured high-light image. In other words, the dynamic range of the output image may be wider than the dynamic range of the captured high-light image.

The electronic device 1 according to the inventive concepts may learn and use the neural ODE network model 210 to adjust the brightness of the captured image appropriately and efficiently. The image signal processor 200 according to the inventive concepts may learn the neural ODE network model 210 through unsupervised learning that does not require predefined data sets. For example, the image signal processor 200 may learn the neural ODE network model 210 based on an image captured in real time from the image sensor 100. The learned neural ODE network model 210 may adjust the brightness of the captured image more accurately and efficiently.

When learning a network model based on supervised learning, the more diverse and numerous the data sets used for supervised learning, the higher the learning effect for the network model. However, the number of data sets used for supervised learning may be limited and biased, thereby limiting the effectiveness of supervised learning of the network model. For example, among deep learning models for improving low-light images, models based on supervised learning may be learned based on low-light (LOL) data sets. When performing supervised learning of the network model based on the LOL data sets, approximately 500 pairs of image data are used. Therefore, because the number of data sets used for supervised learning is limited, it is difficult to learn the network model for various exposure conditions. Additionally, image data included in the data sets may be biased depending on the intention or preference of the data set producer, making it difficult to learn the network model efficiently.

The neural ODE network model 210 according to the inventive concepts may perform unsupervised learning based on a loss function on the basis of the pixel values PV and the adjusted pixel values AV. For example, the neural ODE network model 210 may be learned based on the plurality of pixel values PV corresponding to the image captured through the image sensor 100 and the plurality of adjusted pixel values AV generated by adjusting the plurality pixel values PV by the neural ODE network model 210. Accordingly, the electronic device 1 according to the inventive concepts may perform accurate and efficient learning of the network model for adjusting the brightness of the captured image because there is no limitation on the data sets for learning. In addition, the learning of the neural ODE network model 210 according to the inventive concepts does not require data sets, so ODE network model 210 may not be affected by the bias of the data sets. Therefore, the electronic device 1 according to the inventive concepts may perform accurate and efficient learning of the neural ODE network model 210 for adjusting the brightness of the real-time captured image.

The neural ODE network model 210 according to some example embodiments may be learned based on the plurality of pixel values PV corresponding to each of a plurality of images captured during different exposure times for the same scene. In this case, the electronic device 1 or the image signal processor 200 may perform more efficient and accurate learning of the neural ODE network model 210.

Conventional devices and methods for training a network model for adjusting brightness of an image train the network model using supervised learning. However, adjustments applied using such network models are susceptible to biases and inefficiencies based on which the data sets the models were trained. Accordingly, the conventional devices and methods fail to train a network model capable to applying to specific devices and real world, uncontrolled conditions.

However, according to some example embodiments, improved devices and methods are provided for training a neural ODE network model. For example, the improved devices and methods may train a neural ODE network model to adjust brightness of an image that has improved training and adaptation. Also, the improved devices and methods may train the neural ODE network model according to continued use and optimization/improvement. Accordingly, the improved devices and methods may overcome the deficiencies of the conventional devices and methods to at least to train a neural ODE network model to apply more robust adjustments resulting in captured data being transformed into more accurate, human readable mediums. Further, there is an improvement in experience and quality of image, as well as efficiency of resource distribution in the whole system being improved based on the above methods and devices.

Referring to FIG. 1, the image sensor 100 and the image signal processor 200 are described as separate components. However, this is for convenience of explanation and is not limited thereto. The image signal processor 200 according to some example embodiments may be included in the image sensor 100.

Figure 2:
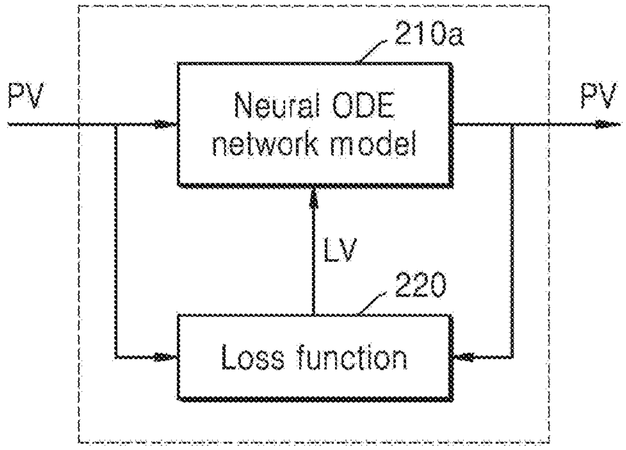
FIG. 2 is a block diagram of a neural ordinary differential equation (ODE) network model according to some example embodiments.

FIG. 2 is a block diagram of a neural ODE network model according to some example embodiments.

Since a neural ODE network model 210*a* of FIG. 2 corresponds to the neural ODE network model 210 described with reference to FIG. 1, overlapping descriptions are omitted.

Referring to FIG. 2, the neural ODE network model 210*a* according to the inventive concepts may receive the plurality of pixel values PV corresponding to the captured image as described above. The neural ODE network model 210*a* may generate the plurality of adjusted pixel values AV by adjusting the plurality of pixel values PV.

The image signal processor (200 in FIG. 1) according to the inventive concepts may learn the neural ODE network model 210*a* based on a loss function 220 on the basis of the plurality of pixel values PV and the plurality of adjusted pixel values AV. The image signal processor (200 in FIG. 1) may generate a loss value LV through the loss function 220. The image signal processor (200 in FIG. 1) may learn the neural ODE network model 210*a* based on the loss value LV. For example, the image signal processor (200 in FIG. 1) may learn the neural ODE network model 210*a* to minimize the loss value LV. Learning the neural ODE network model 210*a* may refer to updating weights and/or biases (e.g., updating parameters) to be described below with reference to FIG. 4.

As described above, the image signal processor (200 in FIG. 1) according to the inventive concepts may perform unsupervised learning based on the loss function 220. Since the image signal processor (200 in FIG. 1) must perform learning without a ground truth image, a preset (or, alternatively, desired, generated, or selected) target exposure level E may be set as shown in Equation 3, which is described below. The loss function 220 according to some example embodiments is expressed as Equation 1.

$$L_{total} = W_{spa}\cdot L_{spa} + W_{exp}\cdot L_{exp} + W_{col}\cdot L_{col} + W_{tv}\cdot L_{tv} + W_{proj}\cdot L_{proj} \quad \text{[Equation 1]}$$

In Equation 1, $L_{total}$ is a loss function 220 (or referred to as a total loss function), $L_{spa}$ is a spatial consistency loss function, $L_{exp}$ is an exposure loss function, $L_{col}$ is a color consistency loss function, $L_{tv}$ is an illumination smoothness loss function, and $L_{proj}$, is a projection loss function. In Equation 1, $W_{spa}$, $W_{exp}$, $W_{col}$, $W_{tv}$, and $W_{proj}$ are weights of the spatial consistency loss function $L_{spa}$, the exposure loss function $L_{exp}$, the color consistency loss function $L_{col}$, the illumination smoothness loss function, and the projection loss function $L_{proj}$, respectively, described above. The $W_{spa}$, $W_{exp}$, $W_{col}$, $W_{tv}$, and $W_{proj}$ may be determined empirically by considering the learning stability of the neural ODE network model 210*a*.

Hereinafter, each of the spatial consistency loss function $L_{spa}$, the exposure loss function $L_{exp}$, the color consistency loss function $L_{col}$, the illumination smoothness loss function $L_{tv}$, and the projection loss function $L_{proj}$ is described in more detail.

The spatial consistency loss function $L_{spa}$ is a loss function used to preserve the difference between each of the plurality of pixels and the adjacent pixel value (e.g., consistency of brightness difference depending on location) in each of the input image and the output image. The spatial consistency loss function $L_{spa}$ according to some example embodiments is expressed as Equation 2 below.

$$L_{spa} = \frac{1}{K}\sum_{i=1}^{K}\sum_{j\in\Omega(i)}\left(\left|m_4(T)_i - m_4(Y)_j\right| - \left|m_4(I_0)_i - \left|m_4(I_0)_j\right|\right)^2 \quad \text{[Equation 2]}$$

In Equation 2, $m_4(\bullet)$ represents a 4×4 average pooling function. That is, to maintain spatial consistency, pixel values pooled through the average pooling function $m_4(\bullet)$ may be used rather than the pixel values of the input image and the output image. In Equation 2, $I_0$ represents the input image, Y represents the output image, i represents the position of each pixel, and j represents the pixel position in four directions (e.g., up, down, left, and right). K may be determined based on the dimension of the input image and the size of the pooling function.

The exposure loss function $L_{exp}$ which is a loss function related to managing the exposure level of the input image may adjust the captured image so that the brightness of the output image is close to a preset (or, alternatively, desired (to be appropriated, etc.), generated, or selected) exposure level based on the exposure loss function $L_{exp}$. The exposure loss function $L_{exp}$ according to some example embodiments is expressed as Equation 3 below.

$$L_{exp} = \frac{1}{M}\sum_{i=1}^{M}\|m_{16}(Y)_i - E\|_2 \quad \text{[Equation 3]}$$

In Equation 3, E is a target exposure level, wherein an appropriate target exposure level may be set empirically. $m_{16}(\bullet)$ is a 16×16 average pooling function. The average pooling function $m_{16}(\bullet)$ is intended to prevent or reduce individual pixel values from directly approaching the target exposure level. M is the number of pixel values (e.g., the number of pixels) of the image that has undergone average pooling.

The color consistency loss function $L_{col}$ is a loss function that keeps the ratios of green, blue, and red in the input image constant. The color consistency loss function $L_{col}$ according to some example embodiments is expressed as Equation 4 below.

$$L_{col} = \sum_{\forall(p,q)\in\varepsilon}(J^p - J^q)^2,\ \varepsilon\{(R, G), (R, B), (G, B)\} \quad \text{[Equation 4]}$$

$J^p$ and $J^q$ refer to average pixel values of p and q channels, respectively.

The illumination smoothness loss function $L_{tv}$ is a loss function to preserve the monotonic pixel relationship between the input image and the output image. By considering the illumination smoothness loss function $L_{tv}$, the relationship between the plurality of pixel values may be preserved and a natural output image may be obtained. The illumination smoothness loss function $L_{tv}$ according to some example embodiments is expressed as Equation 5 below.

$$L_{tv} = \frac{1}{N}\sum_{t=1}^{N}\sum_{c\in\xi}(|\nabla_x A_t^c| + |\nabla_y A_t^c|)^2,\ \xi \in \{R, G, B\} \quad \text{[Equation 5]}$$

$\nabla_x$ and $\nabla_y$ may refer to horizontal and vertical slopes of an image, respectively, and the illumination smoothness loss function L may be used for learning because the illumination smoothness loss function is applied not only to a final image but also to intermediate images generated during the process of generating the final image. The term At is a curve parameter map for the input image. The curve parameter map is described in more detail below with reference to FIG. 5.

The projection loss function $L_{proj}$ is a loss function for accurately extracting the above-described curve parameter map by removing unnecessary (or, alternatively, not desired or selected) parts (e.g., excessive edges) of the input image. The projection loss function according to some example embodiments is expressed as Equation 6 below and may be understood by referring to Equation 7 and Equation 8 below together.

$$L_{proj} = L_{res} + L_{cons} \quad \text{[Equation 6]}$$

$L_{res}$ is a residual loss function, wherein the residual loss function $L_{res}$ is a loss function related to learning about noise, not images. $L_{cons}$ is a consistency loss function, wherein the consistency loss function $L_{cons}$ is a loss function to ensure the consistency between the result of down-sampling the image from which the noise was removed and the result of removing the noise of the down-sampled image. The residual loss function r and the consistency loss function $L_{cons}$ according to the inventive concepts are expressed as Equation 7 and Equation 8 below.

$$L_{res} = \frac{1}{2}\left(\|D_1(I_t) - g(D_1(I_t)) - D_2(I_t)\|_2^2 + \|D_2(I_t) - g(D_2(I_t)) - D_1(I_t)\|_2^2\right) \quad \text{[Equation 7]}$$

In Equation 7, I is an input image, $g(\bullet)$ is a denoising function that removes unnecessary (or, alternatively, not desired or selected) features of the input image I, $I_t$ is an image at stage t, and each of $D_1$ and $D_2$ refers to a convolution kernel, wherein the input image $I_t$ at stage t may be down-sampled into two images through each of $D_1$ and $D_2$.

$$L_{cons} = \frac{1}{2}\left(\|D_1(I_t) - g(D_1(I_t)) - (D_1(I_t - g(I_t))\|_2^2 + \|D_2(I_t) - g(D_2(I_t)) - (D_2(I_t - g(I_t))\|_2^2\right) \quad \text{[Equation 8]}$$

Equation 8, which refers to the consistency loss function $L_{cons}$, may be understood from the above.

The loss function 220 described above is an example and the inventive concepts are not limited thereto. The loss function 220 may be set differently depending on the user's intention or the performance of the image sensor. The image signal processor (200 in FIG. 1) according to the inventive concepts may learn the neural ODE network model 210*a* based on the loss function 220 described above.

The image signal processor (200 in FIG. 1) according to the inventive concepts may generate the adjusted pixel value AV by adjusting the plurality of pixel values PV through the neural ODE network model 210*a*. The image signal processor (200 in FIG. 1) may generate the loss value LV based on the adjusted pixel value AV obtained by adjusting the plurality of pixel values PV through the loss function 220 described above. The image signal processor (200 in FIG. 1) may learn the neural ODE network model 210*a* based on the loss value LV. Therefore, the image signal processor (200 in FIG. 1) may learn the neural ODE network model 210*a* based on the plurality of pixel values PV and the plurality of adjusted pixel values AV generated through the neural ODE network model 210*a*. The image signal processor (200 in FIG. 1) may adjust the brightness of the captured image more accurately based on the learned neural ODE network model 210*a*.

Referring to FIG. 2, the loss function 220 is shown as a separate configuration from the neural ODE network model 210*a*, but this is for convenience of explanation. For example, the loss function 220 may be calculated by the image signal processor 200 of FIG. 1 and/or the neural ODE network model 210*a*.

Figure 3:
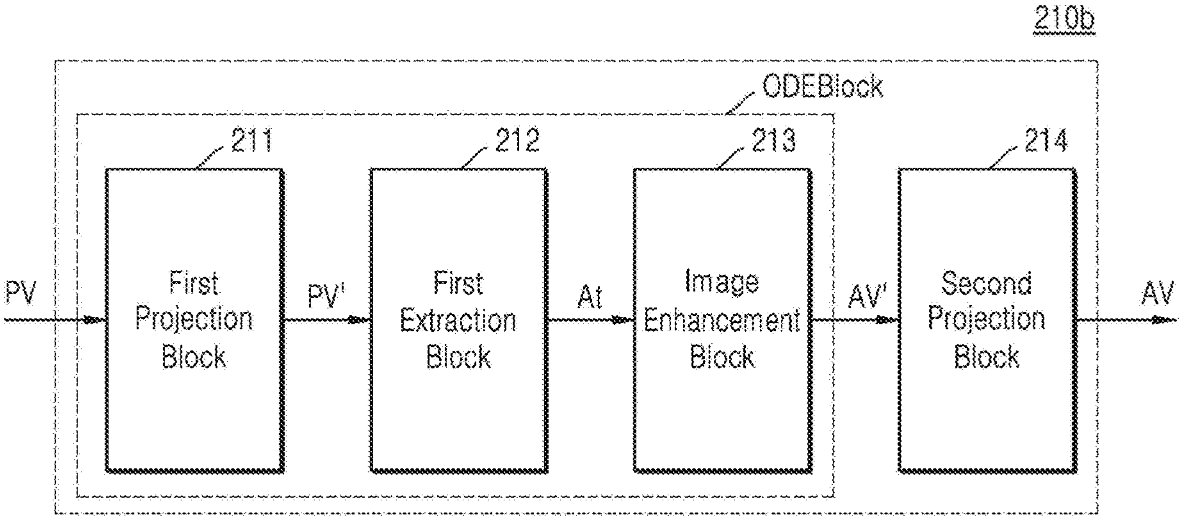
FIG. 3 is a block diagram of a neural ODE network model according to some example embodiments.

FIG. 3 is a block diagram of a neural ODE network model according to some example embodiments.

Since the neural ODE network model 210*b* of FIG. 2 corresponds to the neural ODE network models 210 and 210*a* described with reference to FIGS. 1 and 2, overlapping descriptions are omitted.

Referring to FIG. 3, the neural ODE network model 210*b* may include an ODE block ODEBlock and a second projection block 214.

The ODE block ODEBlock may include a first projection block 211, a feature extraction block 212, and an image enhancement block 213.

The first projection block 211, the feature extraction block 212, the image enhancement block 213, and the second projection block 214 may be learned through the loss function (220 in FIG. 2) described above with reference to FIG. 2. For example, the first projection block 211 and the second projection block 214 may be learned based on the projection loss function $L_{proj}$ described above with reference to FIG. 2.

Referring to FIG. 3, the first projection block 211 may receive a plurality of pixel values PV. The plurality of pixel values PV received by the first projection block 211 may correspond to an image processed by a convolution network. The first projection block 211 is used to extract a more accurate curve parameter map At by removing unnecessary (or, alternatively, not desired or selected) features of the captured image. The first projection block 211 may generate a plurality of corrected pixel values PV' by removing unnecessary (or, alternatively, not desired or selected) features of the image based on the plurality of pixel values PV. In the inventive concepts, the unnecessary (or, alternatively, not desired or selected) features may refer to excessive edges included in the captured image.

The feature extraction block 212 may receive the plurality of corrected pixel values PV' and extract the curve parameter map At of the image based on the plurality of corrected pixel values PV'. The curve parameter map At refers to parameters for adjusting the dynamic range for each of the plurality of pixel values PV corresponding to the image. The neural ODE network model (210*a* in FIG. 2) according to the inventive concepts may generate an adjustment function for generating intermediate pixel values AV' based on the curve parameter map At. The adjustment function is described below with reference to FIG. 6.

The image enhancement block 213 may receive the curve parameter map At and generate the intermediate pixel values AV' by adjusting the pixel values PV based on the received curve parameter map At and the adjustment function. The intermediate pixel value AV' may be greater than or equal to the pixel value PV but is not limited thereto. For example, the image captured by the image sensor (100 in FIG. 1) may be a low-light image. Accordingly, the plurality of pixel values PV may correspond to a low-light image and the intermediate pixel values AV' may correspond to an output image obtained by adjusting the brightness of the low-light image. That is, the output image may be a relatively brighter image than the captured image. Therefore, the intermediate pixel value AV' may be greater than or equal to the pixel value PV. As a result, the dynamic range of dark areas in the captured image may be improved to produce a higher quality output image.

Additionally, the image signal processor (200 in FIG. 1) according to the inventive concepts may adjust the brightness of the image captured in a high-light environment, based on the neural ODE network model 210*b*. Accordingly, the dynamic range of bright areas in the captured image may be improved to produce a higher quality output image.

The second projection block 214 according to the inventive concepts may generate the adjusted pixel values AV corresponding to the final image by additionally removing unnecessary features of the image corresponding to the intermediate pixel values AV'. The second projection block 214 may be referred to as a reprojection block.

Referring to FIG. 3, the neural ODE network model 210*b* is shown as composed of a plurality of different blocks but this is for convenience of explanation. The neural ODE network model 210*b* may perform the operations of the plurality of blocks described above through a plurality of layers related to each other, as shown in FIG. 4, to be described below.

Figure 4:
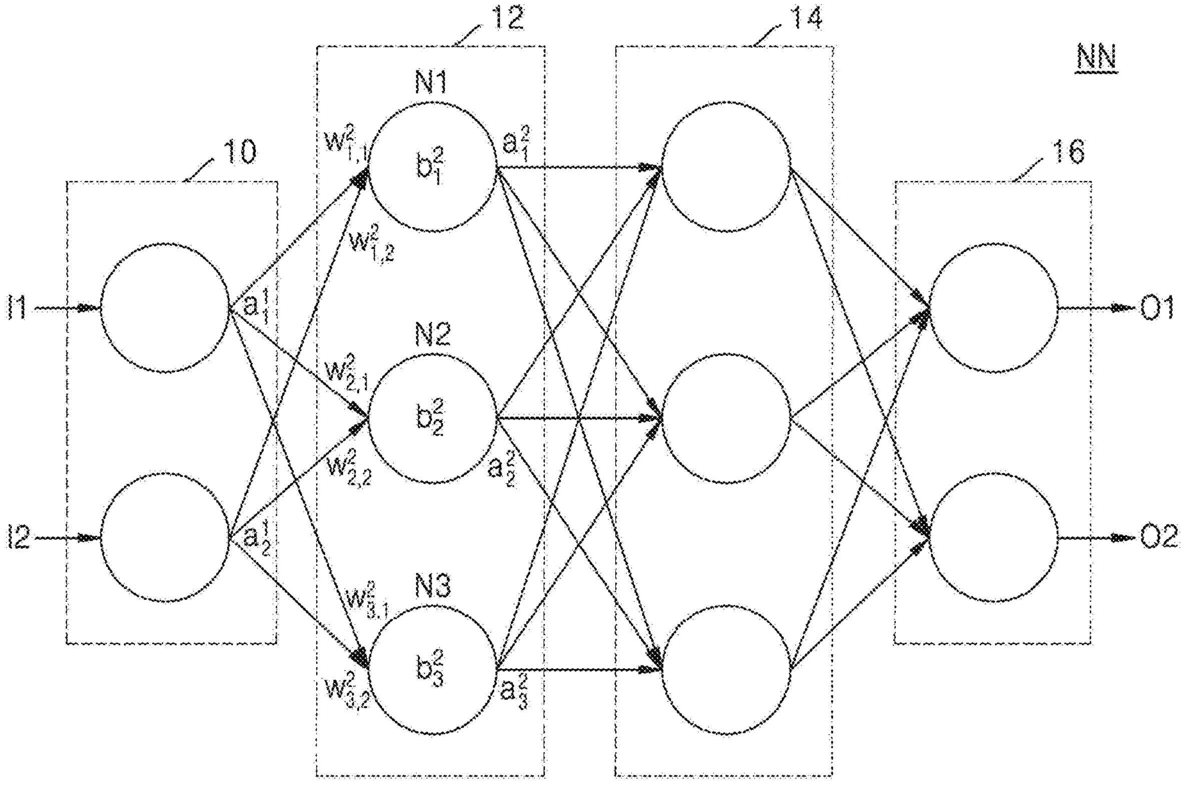
FIG. 4 is a block diagram of an implementation example of a neural network to explain a neural ODE network model according to some example embodiments.

FIG. 4 is a block diagram of an implementation example of a neural network to explain a neural ODE network model according to some example embodiments.

The neural ODE network model according to the inventive concepts may be based on a neural network. The neural network NN in FIG. 4 is intended to aid understanding of the neural ODE network model structure according to the inventive concepts but is not limited thereto.

The neural ODE network model 210*b* described above with reference to FIG. 3 may be configured similarly to the neural network NN described with reference to FIG. 4.

Referring to FIG. 4, the neural network NN may have a structure including an input layer, hidden layers, and an output layer. The neural network NN may perform calculations based on received input data (e.g., I1 and I2) and generate output data (e.g., O1 and O2) based on the performance result. The input data I1 and I2 may include a plurality of pixel values corresponding to the input image.

The neural network NN may include a deep neural network DNN or an n-layers neural network that includes two or more hidden layers. For example, the neural network NN may include a DNN including an input layer 10, first and second hidden layers 12 and 14, and an output layer 16. The plurality of layers may be implemented as a convolutional layer, a fully-connected layer, a SoftMax layer, and the like.

For example, the convolutional layer may include convolution, pooling, activation function operations, etc. Alternatively, the convolution, pooling, and activation function operations may each constitute a layer. However, as described above, the neural ODE network model according to the inventive concepts are not limited thereto.

The output of the plurality of layers 10, 12, 14, and 16 may be referred to as features (or feature map). The plurality of layers 10, 12, 14, and 16 may receive features generated in the previous layer as input features and generate output features or output signals by calculating the input features. The features refer to data that expresses various characteristics of input data that the neural network NN may recognize.

When having a DNN structure, the neural network NN may include more layers to extract valid information, thereby processing complex data sets. The neural network NN is shown as including four layers 10, 12, 14, and 16, but this is only an example. The neural network NN may include fewer or more layers than four layers. Additionally, the neural network NN may include layers of various structures that are different from those shown in FIG. 3.

Each of the plurality of layers 10, 12, 14, and 16 included in the neural network NN may include a plurality of neurons. The neurons may correspond to a plurality of artificial nodes, known as processing elements (PE), units, or similar terms. For example, as shown in FIG. 4, the input layer 10 has two neurons (nodes) and the first hidden layer 12 and the second hidden layer 14 each have three neurons (nodes). However, this is only an example. Each layer included in the neural network NN may include a varying number of neurons (nodes).

The neurons included in each of the plurality of layers 10, 12, 14, and 16 included in the neural network NN may be connected to each other and exchange data. One neuron may receive data from other neurons, perform calculations, and output the calculation result to other neurons.

The input and output of each of the neurons (nodes, such as N1, N2 and N3) may be referred to as input activation and an output activation. That is, the activation may include the output of one neuron as well as a parameter corresponding to the input of neurons included in the next layer. Each of the neurons may determine an output activation thereof based on output activations (e.g., $$\left(\text{e.g., } a_1^1, a_2^1, a_1^2, a_2^2, a_3^2\right)$$

received from neurons included in the previous layer, weights (e.g., $$\left(\text{e.g., } w_{1,1}^2, w_{1,2}^2, w_{2,1}^2, w_{2,2}^2, w_{3,1}^2, w_{3,2}^2\right),$$

and biases (e.g., $$\left(\text{e.g., } b_1^2, b_2^2, b_3^2\right).$$

The weight and bias are parameters (also referred to as calculation parameters) used to calculate the output activation in each neuron, wherein the weight is a value assigned to the connection relationship between neurons and the bias is a weight related to each neuron. The neural network NN may determine parameters, such as weight and bias, based on the loss value generated by the loss function, as described above with reference to FIG. 2. More specifically, the neural ODE network model according to the inventive concepts may update the weight and the bias based on the loss value generated by the loss function on the basis of pixel values corresponding to the input of the neural network ODE model and adjusted pixel values corresponding to the output of the neural network ODE model. Hereinafter, updating the weight and/or bias (e.g., updating parameters) may be referred to as learning the neural ODE network model.

In some example embodiments, the neural network NN may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above, but are not limited to the above examples. Alternatively or additionally, the processor 30 may implement other forms of artificial intelligence and/or machine learning based on the learning data, such as, for example, linear and/or logistic regression, statistical clustering, Bayesian classification, decision trees, dimensionality reduction such as principal component analysis, and expert systems; and/or combinations thereof, including ensembles such as random forests. Herein, an artificial neural network may have any structure that is trainable, e.g., with learning data that is used as training data.

Figure 5:
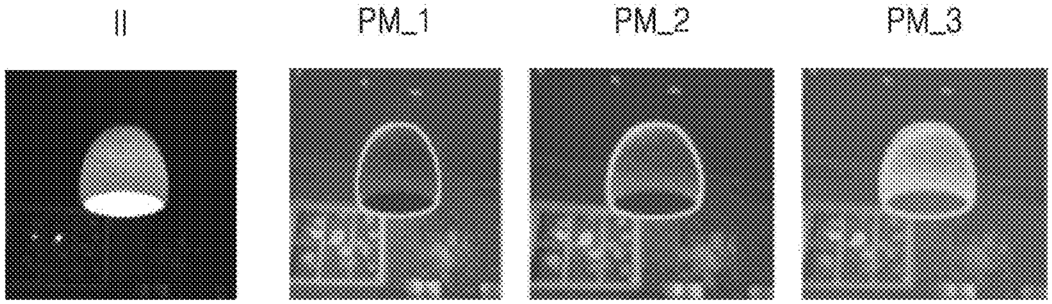
FIG. 5 is a diagram of a curve parameter map of an input image according to some example embodiments.

FIG. 5 is a diagram of a curve parameter map of an input image according to some example embodiments.

FIG. 5 shows an input image II captured in a low-light environment, and a first curve parameter map PM_1, a second curve parameter map PM_2, and a third curve parameter map PM_3 corresponding to red, green, and blue channels, respectively, extracted from the input image II by the neural ODE network model. The input image II may be a low-light image captured in a low-light environment. However, as described above, the inventive concepts are not limited thereto.

The size of each of the first curve parameter map PM_1, the second curve parameter map PM_2, and the third curve parameter map PM_3 may be the same as the size of the input image II. Therefore, each of the first curve parameter map PM_1, the second curve parameter map PM_2, and the third curve parameter map PM_3 may include a curve parameter corresponding to each of the plurality of pixels included in the image sensor (100 in FIG. 1). The curve parameter corresponding to each of the plurality of pixels may include a value between −1 and 1. However, the inventive concepts are not limited thereto.

The neural ODE network model according to the inventive concepts may calculate an adjustment function corresponding to each of the plurality of pixel values based on the plurality of pixel values and the curve parameter corresponding to each of the plurality of pixels. The adjustment function is described in more detail below with reference to FIG. 6.

The first curve parameter map PM_1, the second curve parameter map PM_2, and the third curve parameter map PM_3 are each extracted from one input image II. Accordingly, each of the first curve parameter map PM_1, the second curve parameter map PM_2, and the third curve parameter map PM_3 has a similar adjustment tendency. However, the optimal adjustment parameters corresponding to the plurality of pixels included in each of the first curve parameter map PM_1, the second curve parameter map PM_2, and the third curve parameter map PM_3 may vary.

Figure 6:
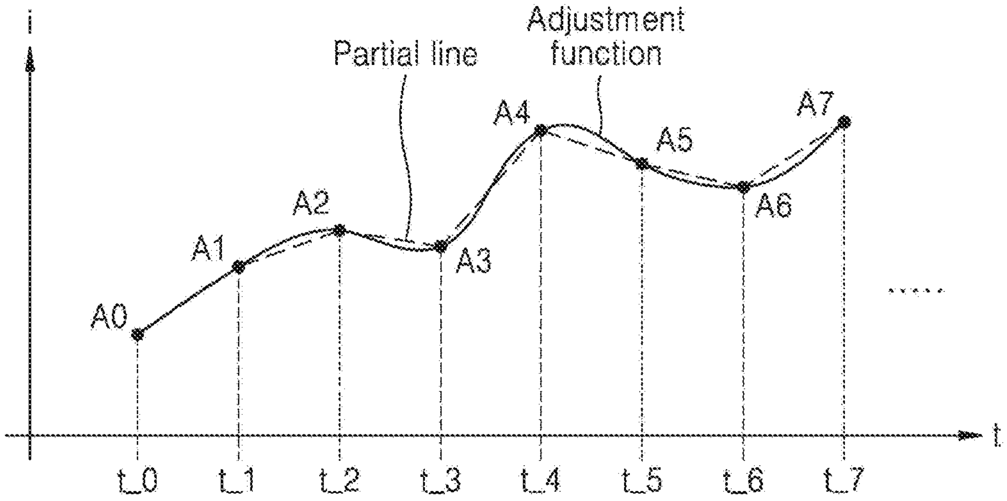
FIG. 6 is a diagram illustrating an adjustment function generated through a neural ODE network model according to some example embodiments.

FIG. 6 is a diagram illustrating an adjustment function generated through a neural ODE network model according to some example embodiments.

FIG. 6 shows an adjustment function representing the adjusted pixel value for the number of adjustment repetitions or adjustment times. Herein, the adjustment function refers to an optimal trajectory in the adjustment section.

Referring to FIG. 6, the horizontal axis corresponds to the number of adjustment repetitions or adjustment times, and the vertical axis corresponds to the pixel value or the adjusted pixel value. The neural ODE network model according to the inventive concepts may generate a plurality of adjustment functions corresponding to the plurality of pixels, respectively. Since the adjustment function in FIG. 6 represents an adjustment function corresponding to one pixel among the plurality of pixels, it may be understood that the plurality of adjustment functions correspond to the plurality of pixels, respectively.

The adjustment function is described in detail with reference to Equations 9 to 12 described below.

Equation 9 shows that pixel values are adjusted based on a pixel value corresponding to one pixel among the plurality of pixels and a curve parameter corresponding thereto.

$$LE(I(x)) = I(x) + a \cdot I(x) \cdot (1 - I(x)) \quad \text{[Equation 9]}$$

x refers to the position of the corresponding pixel in the captured image, I(x) refers to the pixel value corresponding to the pixel located at x, that is, brightness LE, and α is the curve parameter described above with reference to FIG. 5.

Equation 10 may generate more accurate adjusted pixels value by repeating the process of Equation 9. The more the process of Equation 9 is repeated, the more accurate convergence can be made to the target brightness level. However, the inventive concepts are not limited thereto and the image signal processor (200 in FIG. 1) may determine an appropriate number of adjustment repetitions. In Equation 9, α may vary for each time the adjustment process is repeated. For example, α in a first adjustment may be different from α in a second adjustment performed based on the result of the first adjustment.

$$LE_t(I_t) = LE_{t-1}(I_{t-1}) + A_t \cdot LE_{t-1}(I_{t-1}) \cdot (1 - LE_{t-1}(I_{t-1})) \quad \text{[Equation 10]}$$

t refers to the number of adjustment repetitions. Therefore, Equation 10 refers to the result of repeating Equation 9 t times.

Referring to FIG. 6 and Equations 9 and 10, the pixel value is A0 and the number of adjustment repetitions t is 7. A1 to A7 may refer to adjusted pixel values obtained by adjusting the pixel value A0.

Equation 11 may be understood with reference to Equation 10 and Equation 9. Referring to Equation 9 and Equation 10, the adjusted pixel value $LE_t(I_t)$ according to the number of adjustment repetitions t times may be understood as a value obtained by adding the amount of change according to the number of adjustment repetitions to the initial pixel value.

$A_t \cdot LE_{t-1}(I_{t-1}) \cdot (1-LE_{t-1}(I_{t-1}))$ in Equation 10 may be expressed as a learnable convolution network e. When t is considered a continuous variable, may be expressed as the differential form of $LE_{t-1}(I_{t-1})$ with respect to t. Therefore, curve estimation, such as the adjustment function in FIG. 6, may be reconstructed into an ODE as shown in Equation 11 below. $h_\theta$ may correspond to the ODEBlock described above with reference to FIG. 3.

$$LE_t(I_t) = LE_{t-1}(I_{t-1}) + h_\theta(LE_{t-1}(I_{t-1}), t) = LE_{t-1}(I_{t-1}) + \frac{dLE_{t-1}(I_{t-1})}{dt} \quad \text{[Equation 11]}$$

Equation 12 is an integral equation where $LE_{t-1}(I_{t-1})$ in Equation 11 is expressed as $I_T$.

$$I_T = I_0 + \int_0^T h_\theta(I_t, t)dt \quad \text{[Equation 12]}$$

In Equation 12, $I_T$ is a final adjusted pixel value which was improved in stage T.

Equation 12 may calculate the adjusted pixel value $I_T$ using an ODE solver. For example, the Euler method or Runge-Kutta method may be used as an ODE solver. T corresponding to the number of adjustment repetitions may be determined by the ODE solver. Accordingly, by varying T depending on the captured image, the inventive concepts may adjust the image based on the most appropriate number of adjustment repetitions for the captured image.

For example, referring to FIG. 6, the image signal processor (200 in FIG. 1) according to the inventive concepts may repeat adjustment of the captured image seven times based on the ODE solver and may calculate the adjustment function, which is a continuous curve function, in the adjustment section (from t_0 to t_7) corresponding to the number of adjustment repetitions. The image signal processor (200 in FIG. 1) may generate the adjusted pixel value based on the adjustment function.

Referring to FIG. 6, the image signal processor (200 in FIG. 1) may calculate the adjustment function based on the neural ODE network model and select the adjusted pixel value A7 on the adjustment function as the adjusted pixel value. The image signal processor (200 in FIG. 1) may generate an output image based on the adjusted pixel value A7 corresponding to a specific pixel. Since the adjusted pixel value A7 is greater than the pixel value A0, the output image may be an image with increased brightness compared to the captured image and may have a wider dynamic range. However, the operation of the image signal processor (200 in FIG. 1) according to the inventive concepts are not limited to increasing the brightness of the low-light image to adjust the brightness thereof. The image signal processor (200 in FIG. 1) according to the inventive concepts may adjust the brightness of a high-brightness image generated by overexposure based on the adjustment function, thereby generating an output image with reduced brightness.

The image signal processor (200 in FIG. 1) according to some example embodiments may determine the number of adjustment repetitions corresponding to each of a plurality of pixels differently. For example, the number of adjustment repetitions corresponding to pixels included in a relatively dark part of a captured low-light image may be greater than the number of adjustment repetitions corresponding to pixels included in a relatively bright part thereof. Accordingly, the dynamic range of the output image may be increased by determining the number of adjustment repetitions corresponding to each of the plurality of pixels corresponding to the captured image differently depending on the brightness of the image.

The image signal processor (200 in FIG. 1) according to the inventive concepts may learn the neural ODE network model based on the above-described loss function. The image signal processor (200 in FIG. 1) may calculate an adjustment function that better matches the target brightness level based on the learned neural ODE network model. Accordingly, the image signal processor (200 in FIG. 1) may generate an output image by performing more accurate brightness adjustment based on the learned neural ODE network model.

As described above, the image sensor (100 in FIG. 1) may capture an image in a low-light environment or a high-light environment, wherein the dynamic range of the captured image may be narrow. The image signal processor (200 in FIG. 1) according to the inventive concepts may receive the plurality of pixel values corresponding to the captured image and generate the adjustment function based on the neural ODE network model. The image signal processor (200 in FIG. 1) may generate the plurality of adjusted pixel values based on the adjustment function. Each of the generated plurality of adjusted pixel values may be greater or less than the corresponding pixel value. Accordingly, the output image corresponding to the plurality of adjusted pixel values may have a wider dynamic range than the dynamic range of the captured image.

Figure 7:
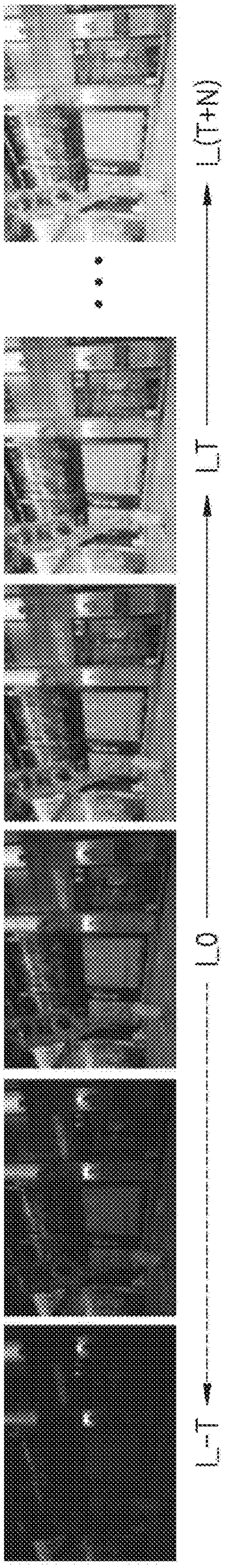
FIG. 7 is a diagram of an output image based on an adjustment function according to some example embodiments.

FIG. 7 is a diagram of an output image based on an adjustment function according to some example embodiments.

FIG. 7 shows a plurality of images with brightness adjusted based on the adjustment function according to FIG. 6.

As described above, the image signal processor (200 in FIG. 1) according to the inventive concepts may adjust the brightness of the image I_0 captured by the image sensor (100 in FIG. 1). Specifically, based on a plurality of pixel values corresponding to the captured image I_0, the image signal processor (200 in FIG. 1) may calculate a plurality of adjustment functions corresponding to the plurality of pixel values, respectively, through the neural ODE network model.

Based on the adjustment function, the image signal processor (200 in FIG. 1) according to the inventive concepts may estimate not only the adjusted pixel value within the adjustment section corresponding to the number of adjustment repetitions but also the adjusted pixel value outside the adjustment section. According to the calculation result of Equation 12 described above, the image signal processor (200 in FIG. 1) may estimate not only the adjustment function within the adjustment section but also the adjustment function outside the adjustment section. Therefore, the image signal processor (200 in FIG. 1) according to the inventive concepts may generate an output image (e.g., I_T) corresponding to the adjustment function within the adjustment section and an output image (e.g., I_−T, I_(T+N)) corresponding to the adjustment function outside the adjustment section.

Referring to FIG. 7, since the image signal processor (200 in FIG. 1) according to the inventive concepts generates the output image (e.g., I_−T, I_(T+N)) corresponding to the adjustment function outside the adjustment section based on the calculated adjustment function, the image signal processor (200 in FIG. 1) may acquire a brighter or darker image depending on the user's selection.

Figure 8:
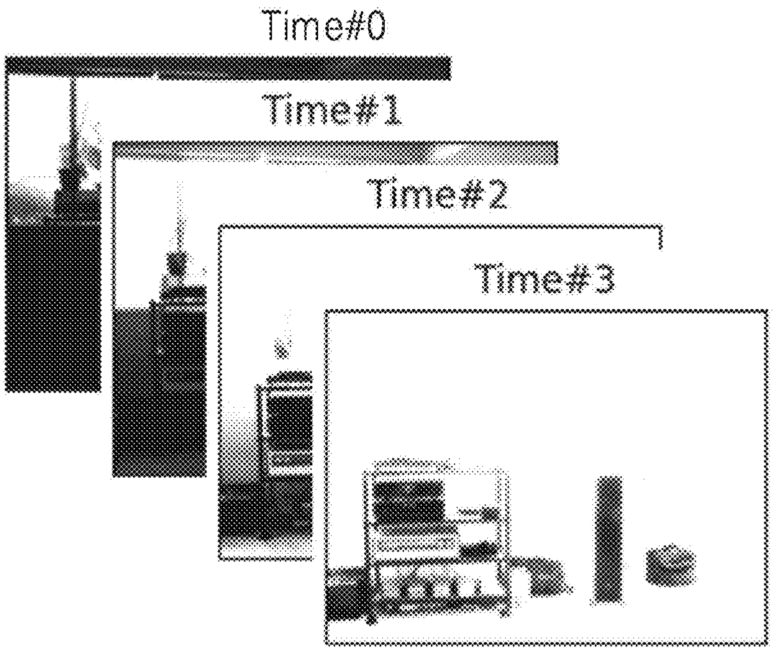
FIG. 8 is a diagram of a plurality of images captured during different exposure times according to some example embodiments.

FIG. 8 is a diagram of a plurality of images captured during different exposure times according to some example embodiments.

FIG. 8 shows a plurality of images captured by the image sensor (100 in FIG. 1) for the same scene during different exposure times Time #0, Time #1, Time #2, and Time #3.

The neural ODE network model according to some embodiments may be learned based on the plurality of images captured during different exposure times Time #0, Time #1, Time #2, and Time #3.

For example, the image signal processor (200 in FIG. 1) according to some example embodiments may generate a plurality of pixel values for each of a plurality of images through the neural ODE network model and may calculate a plurality of adjustment functions corresponding to the plurality of pixels, respectively. The image signal processor (200 in FIG. 1) may generate a plurality of adjusted pixel values based on the plurality of adjustment functions and learn the neural ODE network model based on the plurality of pixel values and the plurality of adjusted pixel values. Specifically, the neural ODE network model may be learned based on the loss function described above with reference to FIG. 2.

When learning the neural ODE network model based on the plurality of images captured during different exposure times Time #0, Time #1, Time #2, and Time #3, learning efficiency may be better than when learning the neural ODE network model based on a single captured image.

Figure 9:
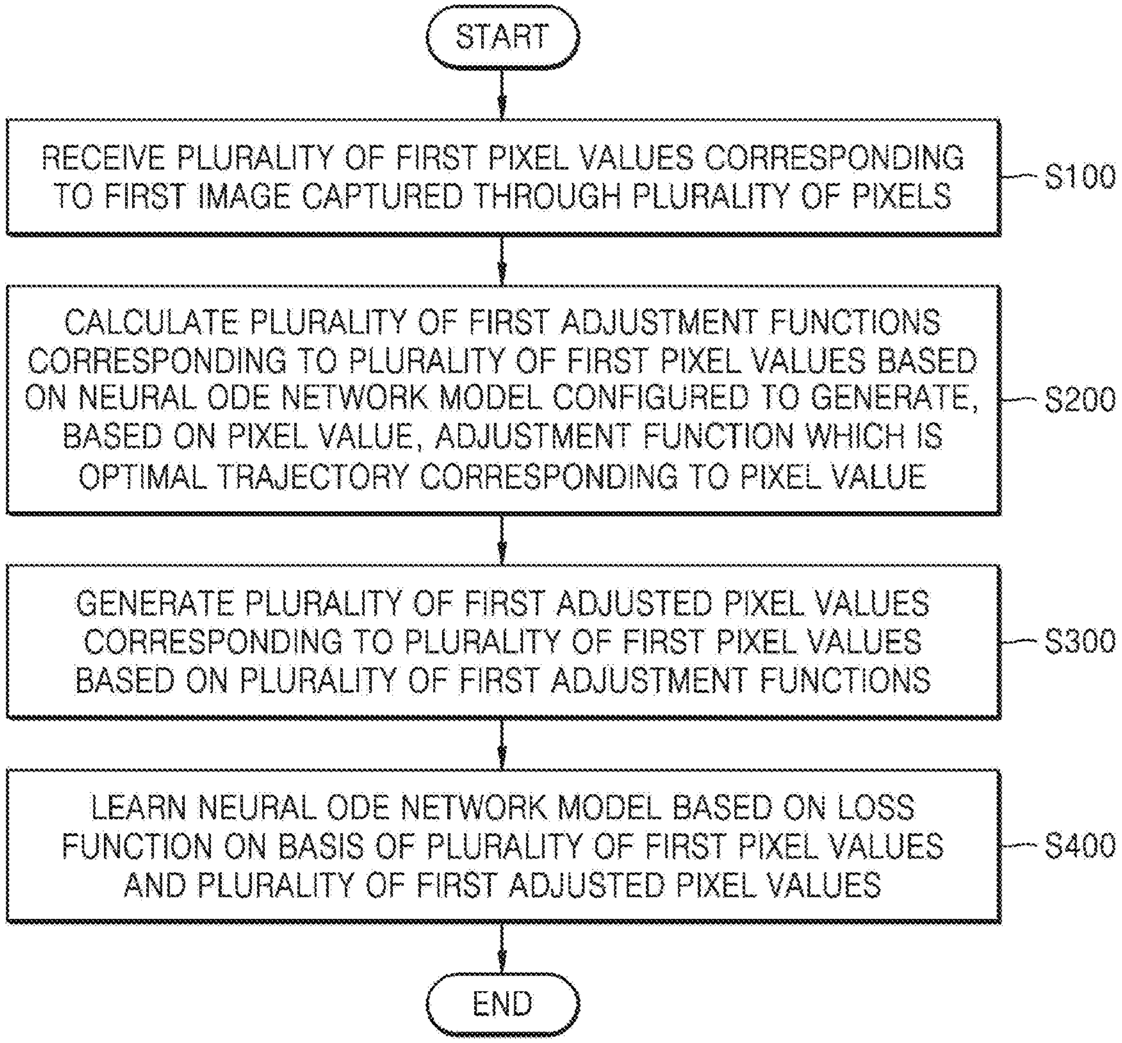
FIG. 9 is a flowchart of a method of operating an image signal processor according to some example embodiments.

FIG. 9 is a flowchart of a method of operating an image signal processor according to some example embodiments.

Referring to FIG. 9, in operation S100, the image signal processor (200 in FIG. 1) may receive a plurality of first pixel values corresponding to a first image captured through a plurality of pixels.

In operation S200, the image signal processor (200 in FIG. 1) may calculate a plurality of first adjustment functions corresponding to the plurality of first pixel values, respectively, based on the neural ODE network model configured to generate, based on a pixel value, an adjustment function which is an optimal trajectory corresponding to the pixel value.

The image signal processor (200 in FIG. 1) according to the inventive concepts may calculate a parameter map corresponding to the first image and calculate the plurality of first adjustment functions based on the first plurality of pixel values and the parameter map.

In operation S300, the image signal processor (200 in FIG. 1) may generate a plurality of first adjusted pixel values corresponding to the plurality of first pixel values, respectively, based on the plurality of first adjustment functions.

In operation S400, the image signal processor (200 in FIG. 1) may learn the neural ODE network model based on a loss function on the basis of the plurality of first pixel values and the plurality of first adjusted pixel values.

Figure 10:
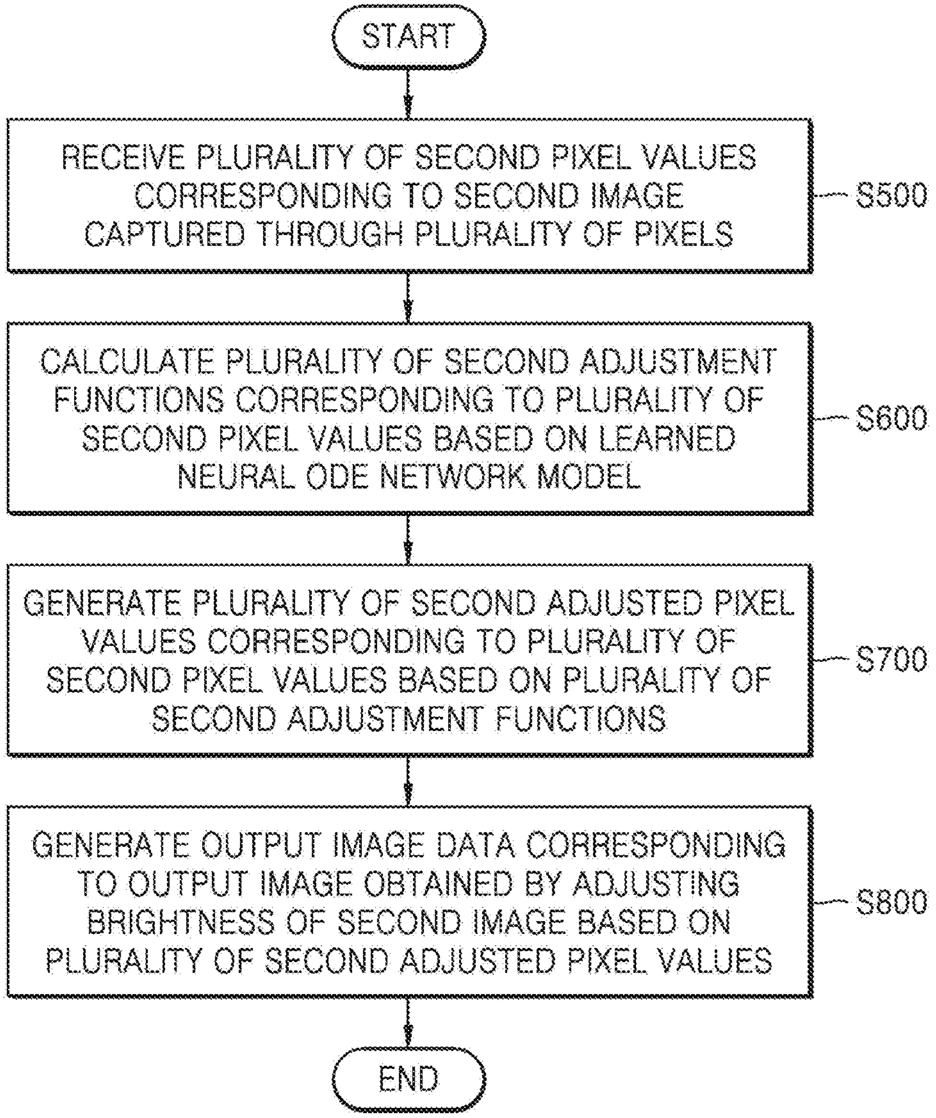
FIG. 10 is a flowchart of a method of operating an image signal processor according to some example embodiments.

FIG. 10 is a flowchart of a method of operating an image signal processor according to some example embodiments.

FIG. 10 may be described with reference to FIG. 9 and overlapping descriptions are omitted.

Referring to FIG. 10, in operation S500, the image signal processor (200 in FIG. 1) may receive a plurality of second pixel values corresponding to a second image captured through a plurality of pixels.

In operation S600, the image signal processor (200 in FIG. 1) may calculate a plurality of second adjustment functions corresponding to the plurality of second pixel values, respectively, based on the learned neural ODE network model.

According to some example embodiments, when the captured image is a low-light image, each of the plurality of second adjusted pixel values may be greater than or equal to the corresponding second pixel value. When the captured image is a high-intensity image, each of the plurality of second adjusted pixel values may be less than or equal to the corresponding second pixel value. As described above with reference to FIG. 6, the second pixel value and the second adjusted pixel value may be values on one second adjustment function.

In some example embodiments, the image signal processor (200 in FIG. 1) may estimate a second adjustment function outside the adjustment section corresponding to the number of adjustment repetitions.

In some example embodiments, the length of the adjustment section of at least one second adjustment function among the plurality of second adjustment functions may be different from the length of the adjustment section of each of the other second adjustment functions. That is, the number of adjustment repetitions for each of the plurality of pixel values may vary. As described above, the captured image may include relatively bright parts and dark parts and the number of adjustment repetitions for pixel values corresponding to each of the bright parts and the dark parts may vary. For example, the number of adjustment repetitions for pixel values corresponding to dark parts may be greater than the number of adjustment repetitions for pixel values corresponding to bright parts. Therefore, the length of the adjustment section of the adjustment function for the pixel values corresponding to the dark parts may be greater than the length of the adjustment section of the adjustment function for the pixel values corresponding to the bright parts.

In operation S700, the image signal processor (200 in FIG. 1) may generate a plurality of second adjusted pixel values corresponding to the plurality of second pixel values, respectively, based on the plurality of second adjustment functions.

In some example embodiments, at least one of the plurality of second adjusted pixel values may be a value outside the adjustment section of the corresponding second adjustment function. In other words, at least one second adjusted pixel value may be a value on the estimated second adjustment function.

In operation S800, the image signal processor (200 in FIG. 1) may generate output image data corresponding to an output image obtained by adjusting the brightness of the second image based on the plurality of second adjusted pixel values. The output image data may then be stored for later display and/or displayed as an output image.

Figure 11:
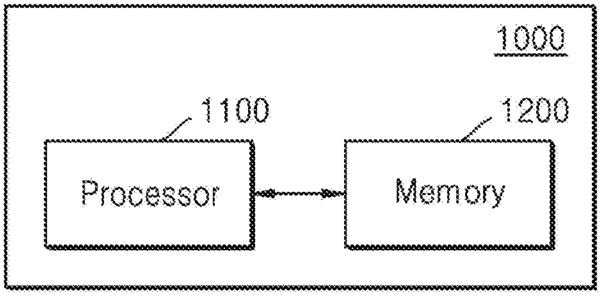
FIG. 11 is a block diagram of a neural network learning device according to some example embodiments.

FIG. 11 is a block diagram of a neural network learning device according to some example embodiments.

Referring to FIG. 11, the neural network learning device 1000 may include a processor 1100 and memory 1200. Although FIG. 11 shows one processor 1100, the inventive concepts are not limited thereto. The neural network learning device 1000 may include a plurality of processors. The processor 1100 may correspond to the image signal processor (200 in FIG. 1) described above.

The processor 1100 may include one or more cores (not shown) and a connection path (e.g., bus, etc.) that exchanges signals with other components, such as a graphics processing unit (GPU) (not shown), and the like.

The processor 1100 may perform the operation of the image signal processor (200 in FIG. 1) described above with reference to FIGS. 1 to 10, such as, learning the neural ODE network model (210 in FIG. 1). For example, the processor 1100 may learn the neural ODE network model (210 in FIG. 1) based on the image captured by the image sensor (100 in FIG. 1). Specifically, the processor 1100 may learn the neural ODE network model (210 in FIG. 1) based on the plurality of pixel values corresponding to the captured image and the plurality of adjusted pixel values corresponding to the brightness-adjusted image.

As described above, the processor 1100 according to the inventive concepts may perform efficient learning, regardless of the number of data pairs included in the data set and the data tendency, by performing unsupervised learning without using the data set.

The processor 1100 may generate an adjustment function corresponding to each of the plurality of pixel values based on the neural ODE network model and may generate the plurality of adjusted pixel values by adjusting each of the plurality of pixel values based on the adjustment function. The processor 1100 may learn the neural ODE network model based on the plurality of pixel values and the plurality of adjusted pixel values. In other words, the processor 1100 may adjust the parameters of the neural network-based neural ODE network model, such as biases and weights, to minimize the same. The processor 1100 may generate an output image with the brightness adjusted by repeating the above-described operation based on the learned neural ODE network model.

The processor 1100 may further include read-only memory (ROM) and random-access memory (RAM) that temporarily and/or permanently store signals (or data) processed within the processor 1100. Additionally, the processor 1100 may be implemented in the form of a system on chip (SoC) including at least one of a GPU, RAM, and ROM.

The memory 1200 may store programs (one or more instructions) for processing and control of the processor 1100. Additionally, the memory 1200 may store intermediate data values generated by the processor 1100 through the neural ODE network model.

Figure 12:
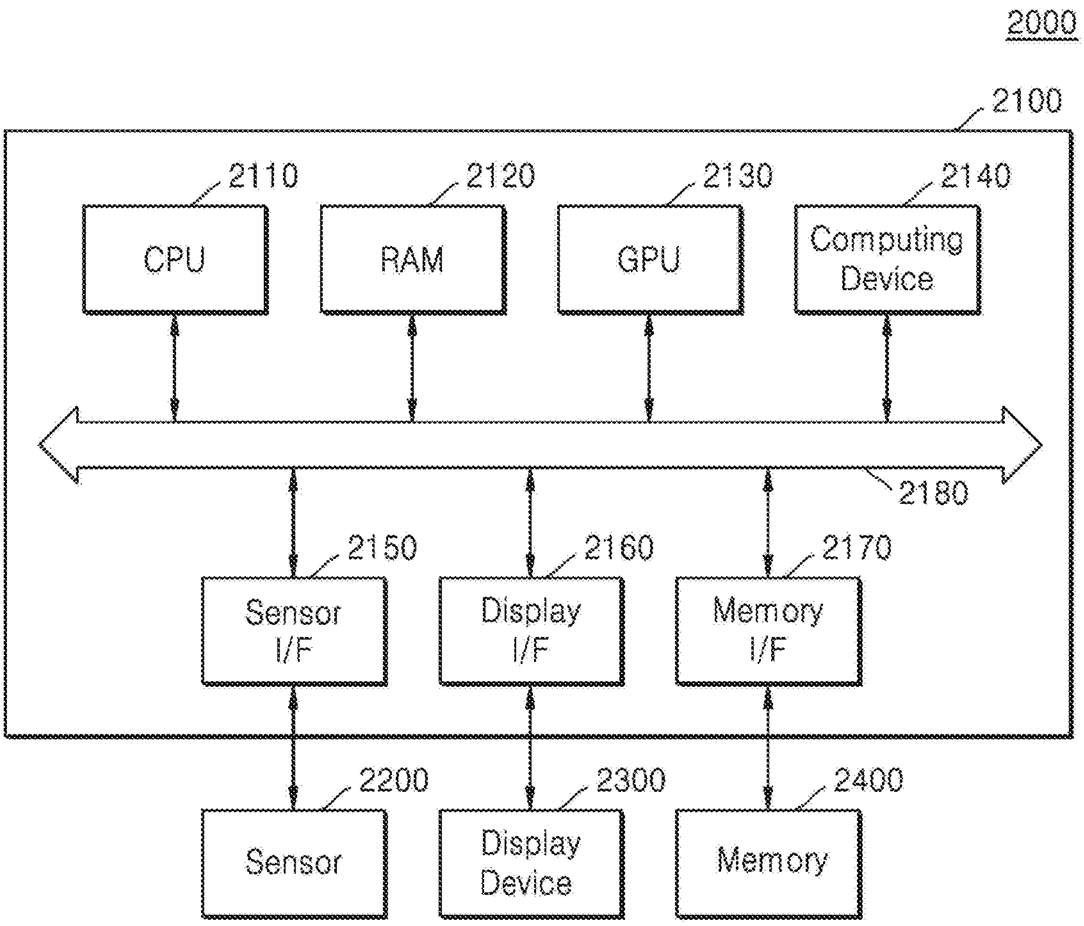
FIG. 12 is a block diagram showing an integrated circuit and a device including the same according to some example embodiments.

FIG. 12 is a block diagram showing an integrated circuit and a device including the same according to some example embodiments.

The device 2000 may include an integrated circuit 2100 and components connected to the integrated circuit 2100, such as a sensor 2200, a display device 2300, and memory 2400. The device 2000 may be a device that processes data based on a neural network. For example, the device 2000 may include a data server or a mobile device, such as a smartphone, a gaming device, an advanced driver-assistance system (ADAS), a wearable device, and the like.

The integrated circuit 2100 according to some example embodiments may include a CPU 2110, RAM 2120, a GPU 2130, a computing device 2140, a sensor interface 2150, a display interface 2160, and a memory interface 2170. In addition, the integrated circuit 2100 may further include other general-purpose components, such as a communication module, digital signal processor (DSP), and a video module. Components of the integrated circuit 2100 (e.g., CPU 2110, RAM 2120, GPU 2130, computing device 2140, sensor interface 2150, display interface 2160, and memory interface 2170) may exchange data with each other through bus 2180. In some example embodiments, the integrated circuit 2100 may include an application processor. In some example embodiments, the integrated circuit 2100 may be implemented as an SoC.

The CPU 2110 may control the overall operation of the integrated circuit 2100. The CPU 2110 may include a single core processor or a multi-core processor. The CPU 2110 may process or execute programs and/or data stored in the memory 2400. In some example embodiments, the CPU 2110 may perform an interpolation model learning method according to some embodiments by executing programs stored in the memory 2400.

The RAM 2120 may temporarily store programs, data, and/or instructions. Depending on some example embodiments, the RAM 2120 may be implemented as dynamic random-access memory (DRAM) or static random-access memory (SRAM). The RAM 2120 may temporarily store data, such as image data, which is input and output through the interfaces 2150 and 2160 or generated from the GPU 2130 or CPU 2110.

In some example embodiments, the integrated circuit 2100 may further include ROM. The ROM may store programs and/or data that are continuously used. The ROM may be implemented as erasable programmable ROM (EPROM) or electrically erasable programmable ROM (EEPROM).

The GPU 2130 may perform image processing on image data. For example, the GPU 2130 may perform image processing on image data received through the sensor interface 2150. The image data processed by the GPU 2130 may be stored in the memory 2400 or provided to the display device 2300 through the display interface 2160.

The computing device 2140 may include an accelerator to perform neural network operations. For example, the computing device 2140 may include a neural processing unit (NPU). In some example embodiments, the GPU 2130 or the computing device 2140 may perform a neural network operation in the learning phase or data recognition phase of the neural network.

The sensor interface 2150 may receive input data (e.g., image data, audio data, etc.) from the sensor 2200 connected to the integrated circuit 2100.

The display interface 2160 may output data (e.g., images) to the display device 2300. The display device 2300 may output image data or video data through a display, such as a liquid-crystal display (LCD) or active-matrix organic light emitting diodes (AMOLED).

The memory interface 2170 may interface data input from the memory 240 outside the integrated circuit 2100 or data output to the memory 2400. Depending on some example embodiments, the memory 2400 may be implemented as volatile memory, such as DRAM or SRAM, or non-volatile memory, such as resistive RAM (ReRAM), phase-change RAM (PRAM), or NAND flash. The memory 2400 may be implemented as a memory card (multimedia card (MMC), embedded MMC (eMMC), security digital (SD), micro-SD, etc.).

In some example embodiments, the integrated circuit 2100 may generate the plurality of adjusted pixel values corresponding to the brightness-corrected output image based on the plurality of pixel values corresponding to the captured image received from the sensor 2200. Additionally, the neural ODE network model may be learned based on the plurality of pixel values and the plurality of adjusted pixel values.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While the inventive concepts have been particularly shown and described with reference to embodiments thereof, it will be understood that various changes in form and details may be made therein without departing from the spirit and scope of the following claims.

What is claimed is:

1. A method of operating an image signal processor, the method comprising:
- receiving a plurality of first pixel values corresponding to a first image captured through a plurality of pixels;
- calculating a plurality of first adjustment functions corresponding to the plurality of first pixel values, respectively, based on a neural ordinary differential equation (ODE) network model configured to generate, based on a pixel value, an adjustment function which is an optimal trajectory corresponding to the pixel value;
- generating a plurality of first adjusted pixel values corresponding to the plurality of first pixel values, respectively, based on the plurality of first adjustment functions; and
- learning the neural ODE network model based on a loss function on the basis of the plurality of first pixel values and the plurality of first adjusted pixel values,
- the adjustment function generated by the neural ODE network model being an optimal trajectory in an adjustment section corresponding to a number of adjustment repetitions for adjusting the pixel value.

2. The method of claim 1, wherein the calculating of the plurality of first adjustment functions comprises
- calculating a parameter map corresponding to the first image, and
- calculating the plurality of first adjustment functions based on the plurality of first pixel values and the parameter map.

3. The method of claim 1, further comprising:
- receiving a plurality of second pixel values corresponding to a second image captured through the plurality of pixels;
- calculating a plurality of second adjustment functions corresponding to the plurality of second pixel values, respectively, based on the learned neural ODE network model;
- generating a plurality of second adjusted pixel values corresponding to the plurality of second pixel values, respectively, based on the plurality of second adjustment functions; and
- generating output image data corresponding to an output image obtained by adjusting a brightness of the second image based on the plurality of second adjusted pixel values.

4. The method of claim 3, wherein
each of the plurality of second adjusted pixel values is greater than or equal to the corresponding second pixel value, and
the second adjusted pixel value and the second pixel value corresponding to each other are values on one second adjustment function.

5. The method of claim 3, wherein
each of the plurality of second adjusted pixel values is less than or equal to the corresponding second pixel value, and
the second adjusted pixel value and the second pixel value corresponding to each other are values on one second adjustment function.

6. The method of claim 3, wherein
the calculating of the plurality of second adjustment functions comprises estimating a second adjustment function outside the adjustment section corresponding to the number of adjustment repetitions, and
at least one of the plurality of second adjusted pixel values is a value outside the adjustment section of the corresponding second adjustment function.

7. The method of claim 3, wherein a length of the adjustment section of at least one second adjustment function among the plurality of second adjustment functions is different from a length of the adjustment section of each of the other second adjustment functions.

8. The method of claim 7, wherein a length of the adjustment section of each of the plurality of second adjustment functions is determined based on a corresponding second pixel value and a second pixel value adjacent to the corresponding second pixel value.

9. The method of claim 3, wherein
the neural ODE network model comprises a reprojection block to remove features of the captured image,
the generating of the plurality of second adjusted pixel values comprises
adjusting the plurality of second pixel values based on the plurality of second adjustment functions and
removing features based on the reprojection block for the adjusted plurality of second pixel values to generate the plurality of second adjusted pixel values.

10. The method of claim 1, wherein
the receiving of the plurality of first pixel values comprises further receiving a plurality of third pixel values corresponding to a third image captured through the plurality of pixels, the third image captured during a different exposure time than the first image for the same scene,
the calculating of the plurality of first adjustment functions comprises further calculating a plurality of third adjustment functions corresponding to the plurality of third pixel values, respectively, based on the neural ODE network model,
the calculating of the plurality of first adjusted pixel values comprises further calculating a plurality of third adjusted pixel values corresponding to the plurality of third pixels, respectively, based on the plurality of third adjustment functions, and
the learning of the neural ODE network model comprises further learning the neural ODE network model based on a loss function on the basis of the plurality of third pixel values and the plurality of third adjusted pixel values.

11. An electronic device comprising:
an image sensor including a plurality of pixels; and
an image signal processor configured to generate adjusted pixel values obtained by adjusting pixel values output from the image sensor,
the image sensor configured to generate a plurality of first pixel values corresponding to a first image captured through the plurality of pixels, and
the image signal processor configured to calculate a plurality of first adjustment functions corresponding to the plurality of first pixel values, respectively, based on a neural ordinary differential equation (ODE) network model configured to generate, based on a pixel value, an adjustment function which is an optimal trajectory corresponding to the pixel value and generate a plurality of first adjusted pixel values corresponding to the plurality of first pixel values, respectively, based on the plurality of first adjustment functions.

12. The electronic device of claim 11, wherein
the image signal processor is further configured to learn the neural ODE network model based on a loss function on the basis of the plurality of first pixel values and the plurality of first adjusted pixel values, and
the adjustment function generated by the neural ODE network model is an optimal trajectory in an adjustment section corresponding to a number of adjustment repetitions for adjusting the pixel value.

13. The electronic device of claim 12, wherein
the image sensor is further configured to generate a plurality of second pixel values corresponding to a second image captured through the plurality of pixels, and
the image signal processor is further configured to
calculate a plurality of second adjustment functions corresponding to the plurality of second pixel values, respectively, based on the neural ODE network model,
generate a plurality of second adjusted pixel values corresponding to the plurality of second pixel values, respectively, based on the plurality of second adjustment functions, and
learn the neural ODE network model based on a loss function on the basis of the plurality of second pixel values and the plurality of second adjusted pixel values.

14. The electronic device of claim 13, wherein the image sensor is configured to capture the first image and the second image during different exposure times for the same scene.

15. The electronic device of claim 11, wherein each of the plurality of first adjusted pixel values is a value within a first adjustment section of the corresponding first adjustment function.

16. The electronic device of claim 15, wherein
a length of the adjustment section of at least one first adjustment function among the plurality of first adjustment functions is different from a length of the adjustment section of each of the other first adjustment functions, and
a length of the adjustment section of each of the plurality of first adjustment functions is determined based on the corresponding first pixel value.

17. The electronic device of claim 11, wherein at least one of the plurality of first adjusted pixel values is a value outside an adjustment section of the corresponding first adjustment function.

18. The electronic device of claim 11, wherein the neural ODE network model comprises a reprojection block to remove features of the captured image, the image signal processor is further configured to adjust the plurality of first pixel values based on the plurality of first adjustment functions and remove features based on the reprojection block for the adjusted plurality of first pixel values to generate the plurality of first adjusted pixel values.

19. A method of operating an electronic device, the method comprising:

generating a plurality of first pixel values corresponding to a first image captured through a plurality of pixels;

calculating a plurality of first adjustment functions corresponding to the plurality of first pixel values, respectively, based on a neural ordinary differential equation (ODE) network model configured to generate, based on a pixel value, an adjustment function which is an optimal trajectory corresponding to the pixel value;

generating a plurality of first adjusted pixel values corresponding to the plurality of first pixel values, respectively, based on the plurality of first adjustment functions;

generating a first loss value based on a loss function on the basis of the plurality of first pixel values and the plurality of first adjusted pixel values; and learning the neural ODE network model based on the first loss value, the adjustment function generated by the neural ODE network model being an optimal trajectory in an adjustment section corresponding to a number of adjustment repetitions for adjusting the pixel value.

20. The method of claim 19, further comprising:

receiving a plurality of second pixel values corresponding to a second image captured through the plurality of pixels;

calculating a plurality of second adjustment functions corresponding to the plurality of second pixel values, respectively, based on the learned neural ODE network model;

generating a plurality of second adjusted pixel values corresponding to the plurality of second pixel values, respectively, based on the plurality of second adjustment functions; and generating output image data corresponding to an output image obtained by adjusting a brightness of the second image based on the plurality of second adjusted pixel values.

* * * * *